United States Patent [19]  [11] 3,898,308
Baum  [45] Aug. 5, 1975

[54] VENTURI SCRUBBER
[75] Inventor: Jorg P. Baum, Essen, Germany
[73] Assignee: Verfahrenstechnik Dr.-Ing. Kurt Baum, Essen, Germany
[22] Filed: Aug. 17, 1973
[21] Appl. No.: 389,346

[30] Foreign Application Priority Data
Aug. 29, 1972 Germany............................ 2242483

[52] U.S. Cl................ 261/69 R; 137/100; 137/486; 137/505.12; 251/5; 261/118; 261/DIG. 54
[51] Int. Cl.².................... B01D 47/10; F16L 55/14
[58] Field of Search........... 261/118, 69 R, DIG. 54; 137/100, 486, 505.12; 251/5

[56] References Cited
UNITED STATES PATENTS

| | | | |
|---|---|---|---|
| 2,604,185 | 7/1952 | Johnstone et al. | 261/118 X |
| 3,039,733 | 6/1962 | Mattioli | 251/5 |
| 3,138,441 | 6/1964 | Krantz | 261/118 X |
| 3,158,666 | 11/1964 | Heller et al. | 261/118 |
| 3,167,413 | 1/1965 | Kiekens et al. | 261/DIG. 54 |
| 3,220,710 | 11/1965 | Forster | 261/DIG. 54 |
| 3,284,064 | 11/1966 | Kolm et al. | 261/DIG. 54 |
| 3,541,601 | 11/1970 | Witte et al. | 261/DIG. 54 |
| 3,552,428 | 1/1971 | Pemberton | 137/486 |
| 3,582,050 | 6/1971 | Kozak | 261/DIG. 54 |
| 3,729,051 | 4/1973 | Mannion et al. | 137/486 X |

FOREIGN PATENTS OR APPLICATIONS 764,429  12/1956  United Kingdom.......... 261/DIG. 54

Primary Examiner—Tim R. Miles
Assistant Examiner—Richard L. Chiesa
Attorney, Agent, or Firm—Charles E. Baxley, Esq.

[57] ABSTRACT

This disclosure teaches a Venturi type scrubber of rectangular cross section and having water jets staggered in a row in opposed wide side walls thereof. Each of the nozzles is provided with a tubular diaphragm to control flow therethrough. The nozzles of each side wall are connected to a water box which in turn communicates with a water feed line via a valve.

7 Claims, 5 Drawing Figures

VENTURI SCRUBBER

BACKGROUND OF INVENTION

The present invention relates to a gas scrubber of Venturi type construction for the removing of solid particles and/or the scrubbing of aerosols and gaseous components from air and gases, having a confuser and a diffuser as transition pieces between gas lines of round cross section and a Venturi neck of square cross section located between them.

Due to their many special advantages, wet-mechanical socalled Venturi scrubbers are being used today for precipitating of solid particles and scrubbing of aerosols and gaseous components to an ever greater extent. It has been found particularly advantageous to use Venturi scrubbers in which the cross section of the Venturi neck is adjustable so that varying quantities of gas can be purified with a constant efficiency of separation. For this purpose the cross section of the neck is changed mechanically by flaps or by axially or radially adjustable inserts. The amount of water fed through the nozzles and the pressure of the water were kept constant. The disadvantage of such an adjustment of the cross section of the neck by itself is that the pressure and feeding of quantities of water to the nozzles in the Venturi neck, in order to obtain an optimum efficiency, cannot be controlled directly during operation; because with a fixed cross section of the nozzle (for instance) a throttling of the quantity of water leads to a decrease in velocity of the jet of water, and thus there is a danger that the jet of water will no longer pass through the free cross section of the neck, but will be dispersed prior to this by the stream of gas and carried along by it. In such an operating condition, the total stream of gas is not cleaned. On the other hand, by feeding larger quantities of water to the nozzles, too hard a jet is produced within the Venturi neck and the jet can no longer be broken down completely by the stream of gas into laminae, so that even in this condition of operation the efficiency of separation is decreased. Due to the above relationships, it follows that Venturi scrubbers having an adjustable gas cross section can be operated successfully only within a relatively narrow range of different operating conditions. In particular it is not possible with the known types of Venturi scrubbers to adjust directly for an optimum efficiency of separation during operation.

STATEMENT OF INVENTION

The present invention is based on a discovery that adapting of the amount of water, and in particular of the pressure of the water, to the quantity and velocity of the gas has a very substantial and apparently decisive effect on efficiency of separation, particularly at high and very high efficiencies. This discovery is based on the fact that for each velocity of the gas in the Venturi neck for a predetermined pressure loss, there is an optimum pressure of the water jet which can be ascertained and adjusted by measurements of efficiency. If the rate of flow of the gas changes, as is practically always the case in industrial processes, this optimum adjustment is lost.

The object of the invention is not only to improve the efficiency of separation of Venturi scrubbers, but to obtain this improvement of the efficiency within a very wide range of different operating conditions. In order to achieve this object there is created a Venturi scrubber in which not only is the quantity and velocity of the gas in the Venturi neck adjusted, but in which the jets of water injected into the neck also are adjustable; in other words, not only is the feed of water to the nozzles adjustable with respect to pressure and quantity, but also the cross sections themselves are variable. Another object of the invention is to provide an automatic control for the different possibilities of adjustment of the values of the feed of gas and water to the Venturi neck so that it is possible in simple fashion to maintain an optimum efficiency of separation in practically any operating condition.

A Venturi-type gas scrubber for precipitating solid particles and/or scrubbing of aerosols and gaseous components out of air and gases, which has a confuser and a diffuser as transition pieces between gas lines of round cross section and a Venturi neck of rectangular cross section located between them is characterized, in accordance with the present invention, by the fact that nozzles arranged in the wide sides of the wall of the neck produce jets of water which are adjustable in cross section. The nozzles are arranged staggered with respect to each other in a plurality of rows located opposite each other. Upstream of the nozzles adjustable flaps are arranged in the wall of the Venturi neck. In accordance with one advantageous embodiment of the invention, the nozzles are provided on their inside with a tubular diaphragm of elastically stretchable material and the space between said diaphragm and the surrounding nozzle housing is connected to a feedline for a fluid whose pressure is adjustably variable. The said space is developed as an approximately annular, concentric cavity.

Advantageously a plurality of nozzles, and preferably each row thereof, are each connected to a common water box, each of the water boxes being provided with a shutoff valve of its own. Measuredvalue transmitters (sensors) are arranged in the water feedline to the water boxes of the nozzles, and the actual quantity determined there is compared with a desired-quantity transmitter and acts on a controller to control a power-actuated regulating valve in the water feedline. The pressure in the water boxes is indicated by a measured-value transmitter to an actual-pressure indicator and compared there with a desired-pressure transmitter and acts via a regulator on a control of the internal pressure in the spaces between the tubular diaphragms and housings of the nozzles. A difference-pressure meter is connected to the Venturi scrubber via a measured-value transmitter, the actual-pressure indicator of which pressure meter, compared with a desired-pressure transmitter, acts on the setting motor of the valve for regulating the quantities of water in the water feedline. The desired-pressure transmitter for the water pressure is developed advantageously as a motor-actuated desired-value setting device which is actuated by the measured values coming from the difference-pressure meter on the Venturi scrubber. It is advantageous to arrange a two-way solenoid valve in the pressure-fluid feedline to the spaces at the nozzle diaphragms.

One method of precipitating solid particles and/or scrubbing aerosols and gaseous components from air and gases by means of a device such as described above is characterized in accordance with the invention by the fact that by control of the desired-value transmitter there is maintained an optimum ratio, within narrow limits, of the quantity of gas to be cleaned (or the velocity of flow thereof) to the intensity and the pressure of the jets of water forming the water grid in the Venturi neck.

Not only are the quantity and the pressure of the water fed to the nozzles in the Venturi neck regulated in accordance with the invention, but furthermore (and this is a very particular advantage) the nozzle cross section is also variable and in accordance with one advantageous further development of the invention the nozzle cross section is regulated as a function of the other measurement data. In this way the intensity and the cross section of the jets of water in the Venturi neck (and thus the water grid which is penetrated by the stream of gas) is formed in optimum fashion so that the jets of water are never too soft, and therefore already deflected strongly and broken up by the stream of gas before they have reached the wall of the Venturi neck lying opposite the corresponding nozzle, and on the other hand that the jets of water are never too hard and therefore cannot be broken up into laminae by the flow of gas passing through but still remain in a hard center core which strikes against the wall opposite the nozzle. Another substantial advantage of the invention is that a periodic automatic cleaning of the nozzles can be obtained without additional mechanical cleaning needles (rams). As is known, the wash water in such gas scrubbers is in practice recycled so that there is a particular danger that impurities which have precipitated out may deposit at the narrowest point of the circuit, and therefore at the nozzles. The nozzle cross sections which are variable in accordance with the invention therefore not only permit the possibility of optimum regulation, but also permit a very simple and, for instance periodic, cleaning of the nozzles so that the danger of clogging and closing of the nozzles is practically excluded in the apparatus according to the present invention.

With the nozzles of adjustable cross section in accordance with the invention, the best setting of the water jets in the Venturi neck can be maintained by means of an automatic control. In principle a higher gas speed (higher pressure loss) results in a higher velocity of the water (higher pressure of water), because otherwise, with too great a disproportion, the excessively weak water jets no longer entirely penetrate through the neck of the Venturi or the water filter is torn apart. This tendency is supported furthermore by a focusing of the stream of gas towards the center of the neck due to the partially closed neck flaps; in other words, with an increasing reduction in pressure, the water pressure also must be raised continuously. On the other hand, with no pressure losses, one cannot proceed from the start from a high water pressure, since the low gas velocities are not completely broken up by excessively hard jets.

DESCRIPTION OF DRAWINGS

The invention will be described in further detail below with reference to the drawings on the basis of illustrative embodiments. In the drawings

DESCRIPTION OF PREFERRED EMBODIMENT

Figure 1:
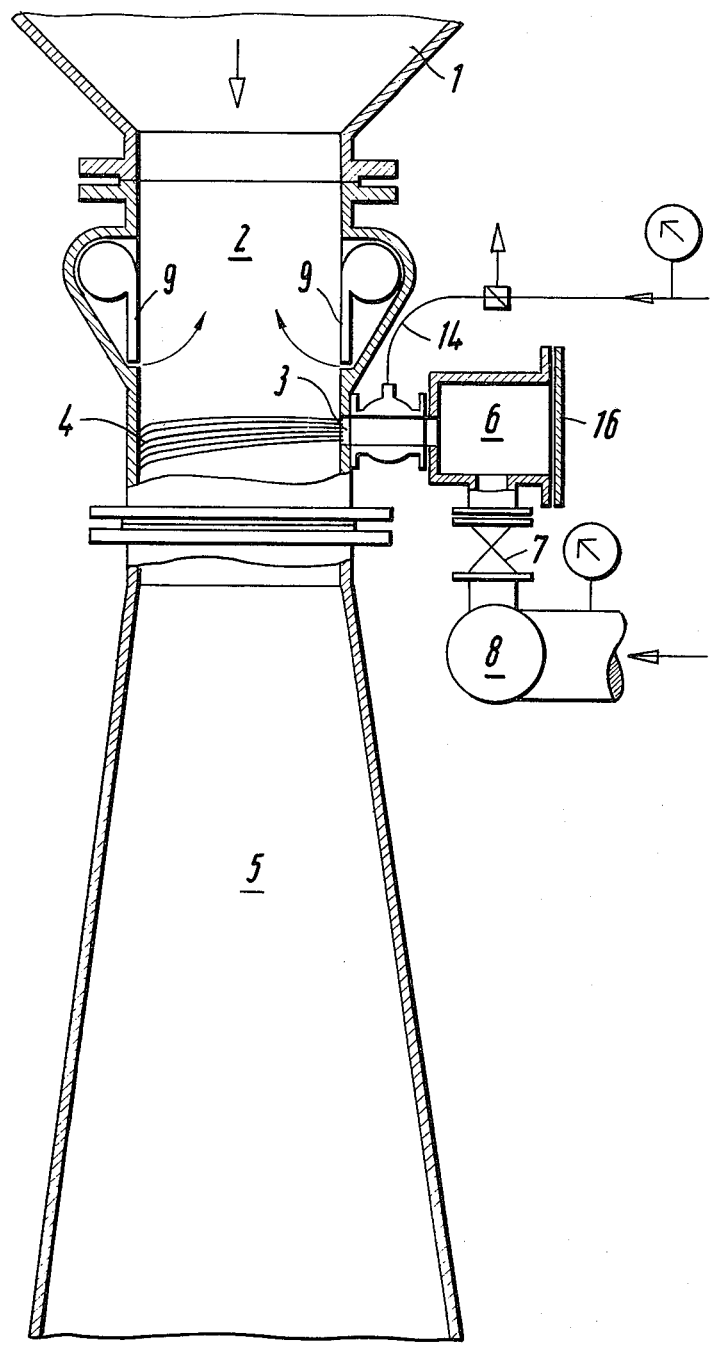
FIG. 1 shows, partially schematically, a longitudinal section through a Venturi scrubber in accordance with the invention.

In accordance with FIG. 1, the actual Venturi neck 2 is arranged between a transition piece 1 and a transition piece 5. These transition pieces change the circular cross section of the gas feed and discharge to the rectangular cross section of the Venturi neck. The Venturi confuser 1 therefore has a round cross section at its inlet end and a rectangular cross section at its outlet end, the said rectangular cross section agreeing with the cross section of the Venturi neck 2. The Venturi diffuser 5 is provided at its inlet end with a rectangular cross section which agrees with the cross section of the Venturi neck, while at its outlet end it has a round cross section which corresponds to the cross section of the connected gas line.

Figure 2:
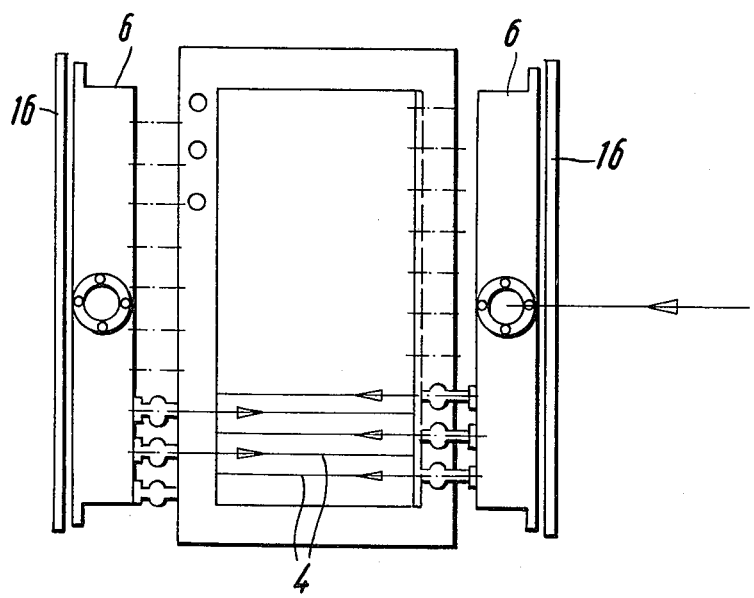
FIG. 2 is a cross section through the neck of the Venturi.

In the Venturi neck 2 a series of nozzles 3 are arranged in the downstream half of the neck on two opposite wide sides thereof. The opposite rows of nozzles are so staggered with respect to each other that the oppositely directed jets of water 4 produced by them in the Venturi neck 2 are equally spaced laterally from each other. A water jet emerging from a nozzle on the righthand side (FIG. 2) therefore strikes the opposite side of the Venturi neck in the center between two nozzle openings on the walls of the Venturi neck.

The nozzles 3 are advisedly combined in sets of ten within a row, with each set connected to a common water box 6. Each of these water boxes is connected via a shutoff valve 7 with a common water feedline 8.

In the upper half of the Venturi neck, as viewed in the direction of flow and therefore above the nozzles 3, adjustable flaps 9 are arranged in the wall of the Venturi neck, by means of which flaps the cross section of flow of the Venturi neck can be varied. The axes of rotation of these flaps 9 are advisedly connected via a gearing outside the housing with a motor drive.

Figure 3:
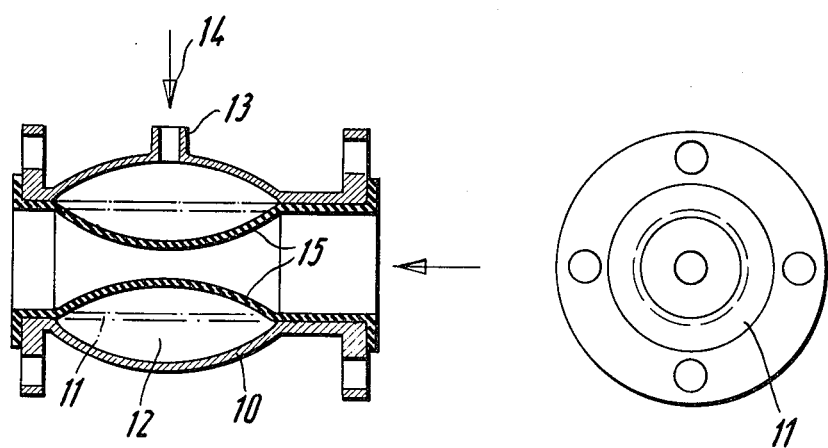
FIG. 3 is a longitudinal section through a nozzle.
Figure 4:
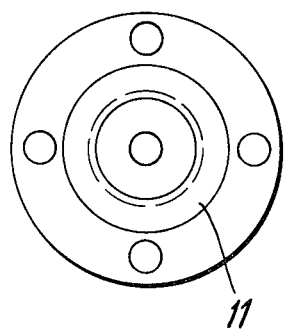
FIG. 4 is a front view of a nozzle.
Figure 5:
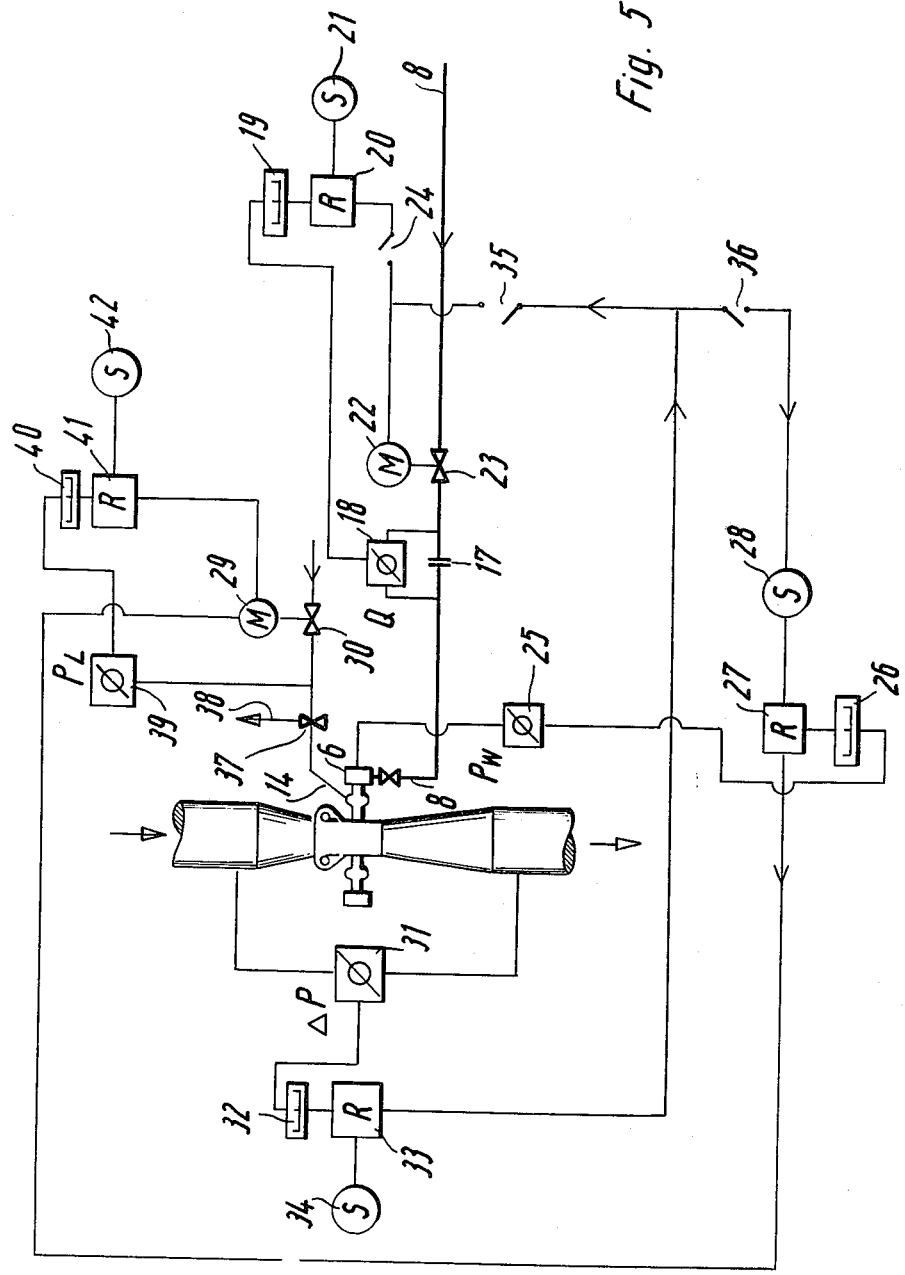
FIG. 5 is a wiring diagram for a completely automatic control of the Venturi scrubber in accordance with the invention.

The nozzles 3 are developed in a special manner in accordance with FIGS. 3 and 4; the nozzle housing 10 is curved towards the outside. Within the nozzle there is arranged a tubular diaphragm 11 of elastically stretchable material which covers the entire inner wall of the nozzle and is firmly connected with the housing at both ends of the nozzle. Between this tubular diaphragm 11 and the arched nozzle housing 10 there is an intermediate space 12 of annular development which is coaxial to the passage space of the nozzle. This intermediate space 12 is connected via a pipe connection 13 in the nozzle housing 10 with a feedline 14. A gaseous or liquid fluid under pressure can be introduced through said feedline 14 into the intermediate space 12 so that the tubular diaphragm 11 is pressed inwards into the cross section of passage of the nozzle uniformly to a greater or lesser extent dependent on the quantity introduced into the intermediate space 12 and thus reduces or narrows the cross section of passage. Such a uniform curving of the tubular diaphragm and thus of the cross section of the nozzle is indicated as crosshatched lines 15 in FIG. 3.

It can be seen that by varying the internal pressure in the hollow space 12, the free cross section of the nozzle can be varied, i.e. the nozzle cross section can in simple fashion be varied continuously as desired during operation. It is of great importance in this connection that the adjustable nozzle is arranged directly on the wall of the neck and that the water jet (due to its concentrically varying cross section with the same speed of the water) retains its kinetic energy despite variable quantities of water when the cross section of the nozzle is controlled as a function of the quantity of water.

The water box 6 connected with each row of nozzles is provided with a cover 16 on the side opposite the nozzles. This cover 16 is fastened by means of screw flanges and packing to the water box. The cover can be removed after the valve 7 has been closed, and thus inspection, repair and cleaning of all connected nozzles is possible in simple fashion.

The further construction of the apparatus in accordance with the invention, and particularly its wiring diagram, will be described in detail below together with its operation:

A measurement aperture 17 is arranged in the water feedline 8 extending to the water boxes 6 and the nozzles 3 and on both sides of this measurement aperture a difference-pressure transmitter 18 is connected to said line. The pressure difference determined here acts on a quantity indicator 19 which indicates the measured values as actual values. The actual values are compared in a controller 20 with desired values from a desired-value transmitter 21. The amount of water which is to be fed to the nozzles is set on the desired-value transmitter. The output signal from the controller 20 is imparted to a servomotor 22 which displaces a control valve 23 which is arranged upstream from the measurement aperture 17 in the water feedline 8. By means of this control valve 23, the amount of water fed to the nozzle is regulated. Between the regulator 20 and the servomotor 22 there is furthermore provided a cutout switch 24 the purpose of which will be explained later.

The water pressure in the water boxes 6 is measured by a pressure transmitter 25 and the result found there is imparted to a water-pressure indicator 26 which is connected as actual-value transmitter to a controller 27. A desired-value transmitter 28 for the water pressure is also connected to the controller 27. The water pressure desired for the specific condition of operation at the nozzles 3 can be set on said desired-value transmitter. The actual value of the actual-value transmitter 26 is compared with the desired value of the desired-value transmitter 28 in the controller 27, and the signal produced on basis of the comparison by the controller 27 passes to a servomotor 29 which displaces a valve 30. This valve 30 lies in the feedline 14 for compressed air to the space 12 between the tubular diaphragm 11 and the housing 10 of the water nozzles 3.

If the amount of water is reduced by means of the control via the valve 23 in the water feedline 8, then with fixed cross section of opening of the nozzles 3, the water pressure will drop and the water jet becomes soft, so that there is the danger that the cross section of the Venturi neck will no longer be passed through by the jets of water. The result would be a greatly impaired efficiency of separation. If a deviation from the desired value 28 is noted via the pressure measurement 25 from the controller 27 due to a reduced quantity of water (18 to 23), a signal passes from the controller to the servomotor 29 of the compressed-air control valve 30. The displacement of this valve sees to it that the spaces between tubular diaphragm and housing in the nozzles 3 receive more compressed air, so that the tubular diaphragms are pressed inwards, as shown by cross-hatched lines in FIG. 3. Accordingly the free cross section of the nozzles 3 is reduced until the desired water pressure (indicated by the desired-value transmitter 28) is again produced in the water box 6 and thus at the nozzles 3.

The control circuits described above therefore act in such a manner that upon a change in the quantity of water fed and thus a decrease in the pressure of the water, an automatic change of the cross section of the nozzle takes places on basis of the setting of the desired-value transmitter, so that the jet of water produced by the nozzles is at all times maintained in its optimum configuration in the Venturi neck, i.e. these water jets never become so weak that they are diverted and broken up by the stream of gas in the Venturi neck before they reach the opposite wall; on the other hand, the jets of water are never so strong that the stream of gas which passes through is not able to break them up completely into laminae in the Venturi neck before they reach the opposite wall.

The Venturi scrubber on the other hand can also be operated in accordance with this method on basis of a constant difference pressure - without further additional mechanical adjusting members - in the manner that the measured values of the gas flow obtained upstream and downstream of the Venturi neck are determined in a difference-pressure transmitter 31 and fed to an indicating instrument 32 as actual-value transmitter. From this actual-value transmitter 32, the values are compared in a controller 33 with the set values coming from a desired-value transmitter 34 and transferred further by the controller 33, and specifically they can on the one hand be transferred to the servomotor 22 of the quantity-control valve 23 in the water feedline 8 when a corresponding switch 35 in the connecting line is closed. This connecting line discharges into the connecting line from the controller 20 of the water-quantity control to the servomotor 22, behind the cutout switch 24 which has just been mentioned. Depending upon what variables of influence are desired for the control, the switches 24 and 35 can be opened or closed; it is, of course, also possible that after the closing of both switches 24 and 35, an automatic control be effected in which all variables of influence effect an adjustment of the quantities of water.

The values or adjusting signals coming from the controller 33 can, however, also be used upon the closing of another cutout switch 36 to act directly on the desired-value transmitter 28 which acts via the controller 27 on a displacement of the cross section of the nozzle. For this purpose the desired-value adjuster 28 for the water pressure is developed as a motor-driven desired-value adjuster, so that the desired value can be adjusted by the signal from the difference-pressure controller 33 in accordance with the varying difference pressure 31.

By means of the control circuit described, practically an entirely automatic operation of the Venturi scrubber in accordance with the invention is possible, in which the operating point, i.e. the values of quantity and pressure of the water fed, as well as the nozzle cross section with respect to the gas flow in the Venturi neck, are always held in an optimum relationship within narrow limits, so that in every condition of operation, and therefore adapted to every change of the gas flow in the Venturi neck, an optimum efficiency of separation is assured.

In order, in line with the invention, to utilize an additional advantage, a two-way solenoid valve 37 is arranged in the compressed-air line to the spaces 12 between the tubular diaphragm 11 and the housing 10 of the nozzles 3 behind the control valve 30, it being installed in such a manner that when the solenoid valve is actuated, the feed of compressed air to the nozzles 3 is blocked off and at the same time the internal pressure is permitted to escape from the space 12 of the nozzles into the atmosphere via a line 38. In this way the tubular diaphragm 11 in the nozzle is completely relaxed and the nozzle cross section opens to its greatest size; the tubular diaphragm may possibly be even forced further outward into the annular space of the intermediate space 12. By this movement of the tubular diaphragm 11, any and all deposits thereon jump off from it and the impurities can be flushed out of the nozzle due to the widening of the cross section. In order to obtain a good cleaning effect, the nozzle is advisedly so designed that the diameter of the completely opened nozzle is about twice the diameter necessary for normal operation, the tubular diaphragm being arched towards the inside in normal operation. Of course, it must be recalled that as illustrative embodiment it is merely indicated here that the tubular diaphragm has its position changed by means of compressed air. Instead of compressed air, water under pressure, hydraulic oil or any other fluid can, of course, be fed in the feedline 14 to the space 12 between the tubular diaphragm 11 and the housing 10 of the nozzles 3.

The line 14 for feeding the pressure fluid to the nozzles 3 can also be provided with a control circuit which consists of a pressure transmitter 39, connected to the line 14 between the setting valve 30 and the solenoid valve 37. This pressure transmitter 39 transmits its values to an actual-value meter 40 which is connected to a controller 41 in which these actual values are compared with desired values by a desired-value transmitter 42. The controller sends its signals to the servomotor 29 for the control valve 30 in the feedline 14 for the pressure fluid. This additional control circuit is first of all very advantageous for monitoring purposes, but it may also be desired that the different control circuits be further connected with each other, for instance by an interconnection or intercontrol of the different desired-value transmitters.

From the above description it can be noted that in accordance with the invention, an apparatus and a method are available for adapting gas scrubbers of Venturi-type construction to substantially all operating conditions which occur in practice and even to effect an automatically controlled adaptation so that assurance is had that the gas scrubber will constantly be operated with an optimum degree of separation, and also be economical in operation, because, as a result of the adaptation of the nozzle cross sections to the water pressure required and the amount of water required, the water grid in the Venturi neck is constantly maintained in a form which is most favorable for optimum separation, the supplying of water and thus the consumption of energy for this supply of water being maintained at a point which is favorable from the standpoint of operating economy.

I claim:

1. A venturi type scrubber, having an axis and having a venturi throat of rectangular cross section and in one plane perpendicular to the axis in each of two opposite walls rows of staggered nozzles fed from water boxes one for each side, the nozzles having means for adjusting their cross section including in combination: a nozzle housing with a round cross section, a tubular diaphragm of elastically stretchable material connected inwardly of the nozzle housing, an annular sealed chamber between the diaphragm and the nozzle housing all of which are concentric about a common axis, means for introducing a fluid under pressure to the sealed chamber, this adjustable nozzle being situated in the immediate vicinity of the side wall, and having further a water feed line from a source of water to each of the two water boxes connected to the water boxes through an adjustable valve.

2. The scrubber of claim 1 with adjustable flaps mounted in the venturi throat upstream of the nozzles.

3. The scrubber of claim 2 with the water feed line provided with a measured-value transmitter, an intended-value transmitter, comparison means connected to the measuredvalue and intended-value transmitters, the valve connected to the comparison means and responsive thereto to control flow in the water feed line.

4. The scrubber of claim 2 with a pressure measured-value transmitter operatively connected to measure pressure in each water box, a pressure intended-value transmitter, comparison means connected to the pressure measured-value and pressure intended-value transmitters, a pressure controller connected to the comparison means and responsive thereto and operatively connected to the sealed chamber to regulate its pressure.

5. The scrubber of claim 4 with a differential pressure transmitter connected operatively to measure pressure differential thereacross, the pressure intended-value transmitter a motor-actuated adjuster connected to and responsive to the differential pressure transmitter.

6. The scrubber of claim 2 with a pressure measured-value transmitter operatively connected to measure pressure differential thereacross, a pressure intended-value transmitter, comparison means connected to the pressure measured-value and pressure intended-value transmitters, the valve connected to the comparison means and responsive thereto to control flow in the water feed line.

7. The scrubber of claim 2 with the nozzle housing enlarged outward of the tubular diaphragm, means for depressurizing the sealed chamber whereby the tubular diaphragm expands outwardly for cleaning.

* * * * *